(12) United States Patent
Nicholl et al.

(10) Patent No.: US 7,041,737 B2
(45) Date of Patent: May 9, 2006

(54) COATING POWDER COMPOSITION, METHOD OF USE THEREOF, AND ARTICLES FORMED THEREFROM

(75) Inventors: Edward G. Nicholl, Reading, PA (US); Andrew T. Daly, Sinking Spring, PA (US); Carryll A. Seelig, Reading, PA (US)

(73) Assignee: Rohm and Haas Company, Philadelphia, PA (US)

( * ) Notice: Subject to any disclaimer, the term of this patent is extended or adjusted under 35 U.S.C. 154(b) by 427 days.

(21) Appl. No.: 10/294,297

(22) Filed: Nov. 13, 2002

(65) Prior Publication Data

US 2003/0100678 A1 May 29, 2003

Related U.S. Application Data

(60) Provisional application No. 60/334,018, filed on Nov. 28, 2001.

(51) Int. Cl.
C08L 67/02 (2006.01)
C08F 20/32 (2006.01)

(52) U.S. Cl. ............... 525/166; 525/170; 525/934; 106/287.22; 106/287.24

(58) Field of Classification Search ............ 525/166, 525/170, 934; 106/287.22, 287.24
See application file for complete search history.

(56) References Cited

U.S. PATENT DOCUMENTS

| | | | | |
|---|---|---|---|---|
| 4,091,049 A * | 5/1978 | Labana et al. | ............... | 525/117 |
| 4,137,277 A * | 1/1979 | Nordstrom et al. | .......... | 525/117 |
| 4,242,253 A | 12/1980 | Yallourakis | .................. | 260/40 |
| 4,681,811 A | 7/1987 | Simpson et al. | ............ | 428/413 |
| 5,436,311 A * | 7/1995 | Hoebeke et al. | ............ | 525/174 |
| 5,470,893 A | 11/1995 | Sinclair-Day et al. | ...... | 523/205 |
| 5,556,732 A * | 9/1996 | Chow | ..................... | 430/137.1 |
| 5,744,522 A * | 4/1998 | Prucnal et al. | ............. | 523/442 |
| 6,027,800 A * | 2/2000 | Sheu | .......................... | 428/327 |
| 6,077,608 A | 6/2000 | Barkac et al. | ........... | 428/411.1 |
| 6,100,342 A * | 8/2000 | Reich et al. | ............. | 525/330.1 |
| 6,310,139 B1 * | 10/2001 | Dumain et al. | ............. | 525/124 |
| 6,380,305 B1 * | 4/2002 | Sheu | ............................ | 525/71 |
| 6,407,181 B1 * | 6/2002 | Daly et al. | ................... | 525/408 |
| 6,537,671 B1 * | 3/2003 | Muthiah | ..................... | 428/413 |
| 6,555,226 B1 * | 4/2003 | Kulzick et al. | ............. | 428/413 |
| 6,881,769 B1 * | 4/2005 | Grob et al. | ................ | 523/457 |
| 2001/0006993 A1 | 7/2001 | Ring et al. | ................... | 524/599 |

FOREIGN PATENT DOCUMENTS

EP 0 480 120 A 4/1992
WO WO 9916837 4/1999

OTHER PUBLICATIONS

P. Thometzek, et. al; "Weather-Stable Low-Gloss Powder Coatings", Technology Forum, Vo. 72, No. 906, Jul. 2000, pp. 75-79.
Abstract—Derwent Publications Ltd. AN 1979-32542B ; XP002268005 & JP 54036339 A (Kansai Paint Co. Ltd) Mar. 17, 1979.
Abstract—Derwent Publications Ltd. AN 1985-253580; XP002268006 & JP 60168771 A (Nippon Oils & Fats Co. Ltd), Sep. 2, 1985.
Abstract, Derwent Publications Ltd. AN 1986-321546; XP002268007 & JP 61236868 A (Nippon Oils & Fats Co. Ltd), Oct. 22, 1986.

* cited by examiner

Primary Examiner—Jeffrey B. Robertson
(74) Attorney, Agent, or Firm—Andrew E. C. Merriam

(57) ABSTRACT

The present invention provides a low temperature curing coating powder composition comprising a mixture of a high gloss film-forming system and a low gloss film-forming system. Preferably, the high gloss film-forming system comprises a GMA (glycidyl methacrylate) resin, a curing agent, and a catalyst and forms a coating having a gloss greater than 80% measured at 60°. Preferably the low gloss film-forming system comprises a carboxyl terminated polyester, acrylic resin and a catalyst and forms a coating having a gloss less than 50% measured at 60°. The composition of the present invention provides coatings having a control gloss, which can range from a low to a high gloss and is useful for coating heat-sensitive substrates.

6 Claims, No Drawings

COATING POWDER COMPOSITION, METHOD OF USE THEREOF, AND ARTICLES FORMED THEREFROM

CROSS REFERENCE TO RELATED PATENT APPLICATIONS

This is a non-provisional application of prior pending U.S. provisional application Ser. No. 60/334,018 filed Nov. 28, 2001.

BACKGROUND

This disclosure relates to coating powder compositions, and in particular to coating powder compositions that form ultraviolet light resistant, low gloss coatings. Coating powders are dry, finely divided particulate compositions that are generally applied to substrates by electrostatic processes in which the powder particles are electrostatically charged and the substrate is earthed. The applied composition is then heated to melt and fuse the particles, and to cure the coating. The particles that do not adhere to the substrate can be recovered for reuse so that coating powders are economical in use of ingredients. Also, coating powder compositions are generally free of added solvents and, in particular, do not use organic solvents and are accordingly nonpolluting.

Another advantage of coating powder compositions is that they can be formulated to provide a variety of characteristics in the coating, for example low or high gloss. There nonetheless remains a need in the art for compositions which can provide a combination of certain characteristics, including low gloss, fine micro-texture, consistent texture, and ultraviolet (UV) light stability, as well as good shelf life and enhanced stability wherein the components of the powder do not separate out upon application to a substrate. Also desirable is coating powders having a lower cure temperature such that a wider variety of heat-sensitive substrates may be coated with the powder coating.

STATEMENT OF INVENTION

A coating powder composition comprises a first film-forming system and a second film-forming system, wherein the coating powder composition cures at a temperature less than 325° F. and results in a coating having less than 50% gloss measured at 60°. The coating powder composition may be advantageously formed by grinding a first film-forming system with a second film-forming system to form particles. Such composition may be cured at low temperature (less than 325° F.

A method of coating an article, preferably a heat sensitive article, comprises applying a coating powder composition comprising a first film-forming system and a second film-forming system to an article, preferably a heat sensitive article; heating the article to melt and fuse the particles to form a coating; and curing coating. The cured powder coating formed from the particulate coating powder composition has less than 50% gloss, preferably less than 30% gloss, and most preferably 10–20% gloss measured at 60°.

DETAILED DESCRIPTION

The weight ratio of the first film-forming system to the second film-forming system is typically 0.5:1 to 1.25:1. The first film-forming system is a low temperature cure coating powder composition that forms a smooth coating characterized by high gloss (greater than 80% gloss at 60° ). The second film-forming system is a low temperature cure coating powder composition that forms a smooth coating characterized by a matte or low gloss appearance (less than 50% at 60°, or less than 30% gloss at 60° ). The second film-forming system may comprise the same or different elements as the first film-forming system. Curing temperatures of the film-forming systems are less than or equal to 325° F., preferably less than or equal to 300° F., and more preferably less than or equal to 250° F.

Coating powder compositions suitable for use as the first and second film-forming compositions comprise polymeric resins such as epoxy-functional acrylic resins, epoxy resins, carboxy-functional polyester resins, hydroxy-functional polyester resins, carboxy-functional acrylic polymers, polyacrylic resins and mixtures comprising at least one of the foregoing resins. Other useful resins may include functional fluoropolymers, functional fluorochloropolymers and functional fluoroacrylic polymers, each of which may be hydroxy-functional or carboxy-functional.

Epoxy-functional acrylic resins include, for example, glycidyl esters of such polyacids as, for example, terephthalic acid, isophthalic acid, phthalic acid, methylterephthalic acid, trimellitic acid, pyromellitic acid, adipic acid, sebacic acid, succinic acid, maleic acid, fumaric acid, tetrahydrophthalic acid, methyltetrahydrophthalic acid, hexahydrophthalic acid, and methylhexahydrophthalic acid. These monomers may be co-polymerized with other $\alpha,\beta$-ethylenically unsaturated monomers. The weight average molecular weight of such epoxy-functional acrylic resins may be from 200 to 200,000; the glass transition temperature (Tg) may be 40° C. to 60° C.; and the softening point 55° C. to 75° C.

A preferred epoxy-functional acrylic resin is a glycidyl methacrylate copolymer ("GMA resin") in the form of a copolymer which may be produced by copolymerizing 20 weight percent (wt %) to 100 wt % glycidyl acrylate or glycidyl methacrylate and 0 wt % to 80 wt % other $\alpha,\beta$-ethylenically unsaturated monomers, such as methyl methacrylate, butyl methacrylate and styrene. Epoxy equivalent weights of the GMA resin are from 200 to 1,000, and more preferably from 200 to 600. The GMA resin typically has a weight average molecular weight from 3,000 to 200,000, and preferably from 3,000 to 20,000, as determined by gel permeation chromatography. The viscosity of the GMA is preferably from 10 to 500 poise, and most preferably from 30 to 3,000 poise at 150° C., as determined by an ICI Cone and Plate Viscometer.

The GMA resin can be prepared under reaction conditions known in the art. For example, the monomers can be added to an organic solvent such as xylene and the reaction conducted at reflux in the presence of an initiator such as azobisisobutyronitrile or benzoyl peroxide. An exemplary reaction may be found in U.S. Pat. No. 5,407,706. In addition, GMA resins are commercially available under the trademark ALMATEX from the Anderson Development Company of Adrian, Michigan. The GMA resin may be present in the first film-forming system in an amount ranging of 20 to 100 parts per hundred parts of resin (phr).

Carboxy-functional polyester ("polyesters") resins may be linear or branched, being formed of polyols and polyfunctional carboxylic acids (or monomers having both —OH and —COOH functionality). Carboxylic functionality is provided in excess over hydroxyl functionality, whereby the polyester chains are carboxyl terminated.

Examples of suitable polyols for forming the polyester resin include 1,2-ethanediol, 1,3-propanediol, 1,4-butanediol, diethylene glycol, 1,6-hexanediol, neopentyl glycol, 1,10-decanediol, 1,4-cyclohexanedimethanol, trimethylolpropane, 2-methyl-1,3-propanediol, hydrogenated bisphenol A [2,2-(dicyclohexanol)propane], 2,2,4-trimethyl-1,3-pentanediol, 3-hydroxy-2,2-dimethylpropyl 3-hydroxy-2,2-dimethylpropanoate (CA. Reg. No. =115-20-4), and 1,12-dodecanediol, 2-methyl-2-hydroxymethyl-1,3-propanediol and 2-ethyl-2-hydroxymethyl-1,3-propanediol.

Examples of suitable poly-functional carboxylic acids include succinic acid, adipic acid, azelaic acid, sebacic acid, 1,12-dodecanedioic acid, terephthalic acid, isophthalic acid, trimesic acid, tetrahydrophthalic acid, hexahydrophthalic acid, 1,4-cyclohexanedicarboxylic acid, trimellitic acid and naphthalene dicarboxylic acid.

The carboxy-functional polyester resins may be formed from hydroxyl terminated polyesters which are then capped with a polyfunctional carboxylic acid. The polyester resins may have a carboxylic acid functionality of at least 1.5 to 4, and preferably at least 2. A linear hydroxyl-terminated polyester resin capped with a dicarboxylic acid will have a functionality of 2. A linear hydroxyl-terminated polyester resin capped with a tricarboxylic acid, such as trimellitic anhydride, will have a functionality of 4. The introduction of branching into the polyester, e.g., through the use of trimethylolpropane, or trimellitic anhydride as monomers, will achieve even higher carboxylic acid functionalities.

Useful polyester resins typically have a Tg of at least 40° C., preferably at least 50° C., and up to 65° C. The polyester resins typically have weight average molecular weights of 2000 to 5000, and may be anywhere from amorphous to highly crystalline. The polyester resins comprise relatively short chains having acid numbers of 15 to 200, and preferably 25–90. The particulate film-forming polymeric resins may comprise a mixture of polyester resins.

Suitable carboxy-functional acrylic polymers ("acrylic polymers") have acid numbers from 15 to 200, where the high acid number of the acrylic polymers promote rapid cross-linking and thereby low temperature curing. Suitable carboxylic acid functional acrylic polymers have weight average molecular weights from 1,000 to 20,000. Suitable Tgs are from 40° C. to 65° C., and suitable softening temperature are from 60° C. to 80° C. The particulate film-forming polymeric resins may comprise mixtures of acrylic polymers.

Acrylic polymers are typically derived from the copolymerization of acid functional monomers with non-acid functional monomers. Suitable acid functional monomers include, but are not limited to, acrylic acid, methacrylic acid, maleic acid, fumaric acid, and citraconic acid. One or more of such acid functional monomers may be used to form the acrylic polymer.

Non-acid functional monomers may include monoesters, diester, triester, or tetraesters of acrylic and methacrylic acids, for example, the methyl, 2-ethyl hexyl, n-butyl, n-hexyl, hydroxyethyl, octyl, 2-ethoxy ethyl, t-butyl, 1,5-pentanediol, N,N-diethylaminoethyl, ethylene glycol, 1,3-propanediol, decamethylene glycol, decamethylene glycol, 1,4-cyclohexanediol, 2,2-propane, glycerol, tripropylene glycol, 2,2-di(p-hydroxyphenyl)-propane, triethylene glycol, polyoxyethyl-2,2-di(p-hydroxyphenyl)propane, polyoxypropyltrimethylol propane, butylene glycol, 1,2,4-butanetriol, 2,2,4-trimethyl-1,3-pentanediol, pentaerythritol, pentaerythritol, 1,5-pentanediol, and 1,4-benzenediol esters. Styrene and substituted styrene, such as 2-methyl styrene and vinyl toluene and vinyl esters, such as vinyl acrylate and vinyl methacrylate may also be copolymerized with the acid functional monomers to obtain desired acid numbers.

Suitable coating powder compositions may furthermore comprise a curing (crosslinking) agent and an optional catalyst. Useful curing agents and catalysts are those active at less than or equal to 325° F. Preferred curing agents are difunctional carboxylic acids. The functionality number relates to the number of —COOH moieties on the molecule. Preferred dicarboxylic acids are sebacic acid and polyanhydrides, both of which are commercially available. Sebacic acid may be used in an amount of up to 22 parts per hundred of resin (phr), preferably 14 to 22 phr. The polyanhydride, such as 1, 12-dodecanedioic polyanhydride (e.g., VXL 1381, from Vianova), may be present in an amount of up to 35 phr, and preferably from 23 to 29 phr. Differing carboxylic-acid cross-linking agents may also be used simultaneously.

Although some of the resins are self-curing, the addition of a catalyst may be useful to raise the curing rate to a commercially desirable value. When present, the catalyst may be used in an amount of 0.1 to 30 parts by weight per 100 parts by weight of the resin. Suitable catalysts include, for example, imidazoles, organoborate salts, polyamines, and phenolics.

Suitable imidazoles have the formula

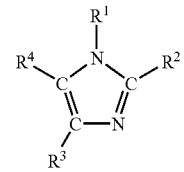

wherein $R^1$–$R^4$ are each independently hydrogen, $C_1$–$C_{12}$ alkyl, $C_6$–$C_{18}$ aryl, $C_7$–$C_{18}$ arylalkyl, $C_7$–$C_{18}$ alkylaryl, or the like. Examples of suitable imidazoles include imidazole, 2-methyl imidazole, and 2-phenyl imidazole (which is commercially available from SKW Chemical Co.). Suitable adducts of such imidazoles with a bisphenol A epoxy resin are available commercially as, for example, EPON® P-101 from Resolution, and ARALDITE® HT-3261 from Vantico. Mixtures of imidazole adducts may be used.

Suitable organoborate salts have the formulae

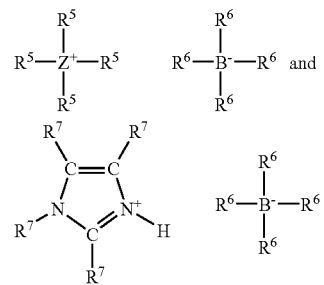

wherein Z is P, As, or N; each $R^5$ is independently $C_1$–$C_{12}$ alkyl, $C_2$–$C_{12}$ alkenyl, $C_6$–$C_{18}$ aryl, $C_7$–$C_{18}$ arylalkyl, $C_7$–$C_{18}$ alkylaryl, or the like; each $R^6$ is independently $C_1$–$C_{12}$ alkyl, $C_6$–$C_{18}$ aryl, $C_7$–$C_{18}$ arylalkyl, $C_7$–$C_{18}$ alkylaryl, Br, Cl, I, F, or the like; and each $R^7$ is independently hydrogen, $C_1$–$C_{12}$ alkyl, $C_2$–$C_{12}$ alkenyl, $C_6$–$C_{18}$ aryl, $C_7$–$C_{18}$ arylalkyl, $C_7$–$C_{18}$ alkylaryl, $C_2$–$C_{12}$ acyl, aldehyde, carboxylate, cyano, nitro, or the like. Specific examples of these compounds and methods for their preparation are provided in U.S. Pat. No. 3,859,379 to Kitamura et al.

Suitable catalysts further include polyamine catalysts such as, for example, ethylene diamine, isophorone diamine, cyclohexylenediamine, and a fluorinated diamines such as 4,4'-hexafluoroisopropylidene bis-aniline. In a preferred embodiment, they may be converted from their usual liquid state into a friable solid that may be pulverized. A friable, solid, low-temperature catalyst may be selected from a blocked polyamine such as an adduct of an epoxy resin having an equivalent weight of from 400 to 800 AMU and an aliphatic polyamine having a primary, secondary, and/or tertiary amino group. The epoxy resin portion of the adduct may be aromatic or aliphatic, as exemplified by the bisphenol-based resins mentioned above and the aliphatic analogs thereof, respectively. The cyclohexanol analog of the bisphenol A-based resin is available under the trade name KUKDO 4100. Higher molecular weight polyamines are preferred when epoxy resins having a low equivalent weight are employed. Suitable catalysts derived from polyamines having a primary amino group are available under the trade name HT 835 from Ciba-Geigy and ANCAMINE® 2337 XS from Air Products. An epoxy adduct of an aliphatic polyamine having a secondary amino group, such as ANCAMINE® 2014 AS from Air Products, may be preferred for white and light colored coatings.

Suitable phenolic catalysts having at least two terminal hydroxyl groups, and are exemplified by, but are not limited to, phenolic catalysts, such as bisphenol A endcapped diglycidyl ether of bisphenol A, which is the reaction product of diglycidyl ether of bisphenol A and bisphenol A. Examples of preferred phenolic catalysts for the epoxy resin components include those sold by the Dow Chemical Company under the trade names D.E.H.® 87, D.E.H.® 85, and D.E.H.® 84, all of which are believed to be bisphenol A endcapped diglycidyl ethers of bisphenol A. Other phenolic catalysts include phenol- and cresol-novolac catalysts sold by Georgia Pacific, Reichhold Chemicals and Ciba-Geigy. The catalyst has a hydroxy equivalent weight (HEW) of 180 to 1000 AMU. Within this range, an HEW of at least 200 AMU may be preferred. Also within this range, an HEW of up to 450 AMU may be preferred.

Other catalysts that can be used to enhance the curing properties include dicyandiamide or o-tolyl biguanide. A suitable dicyandiamide catalyst is sold under the trade name DYHARD® 100M by SKW Chemicals. A suitable o-tolyl biguanide catalyst is sold under the trade name CASAMINE® OTB by Swan Chemical.

Mixtures of catalysts may be used. For example a phenolic catalyst may be used in combination with an imidazole such as 2-methylimidazole or 2-phenylimidazole pre-dispersed at 0.05 to 5 weight percent, based on the total catalyst.

The composition may, optionally, comprise one or more additives known in the art. Such additives include, for example, flow control agents, dry flow agents, antioxidants, pigments, optical brighteners, extenders, UV light stabilizers, and combinations comprising at least one of the foregoing additives.

Flow control agents, sometimes called leveling agents, are useful to promote the formation of a continuous coating. Suitable flow control agents include polyacrylic esters, non-ionic fluorinated alkyl ester surfactants, non-ionic alkylarylpolyether alcohols, silicones, and the like, and combinations comprising at least one of the foregoing flow control agents. Flow control agents are generally liquids that have been converted to powder form by absorption onto silica-type materials. A preferred flow control agent is sold under the tradename RESIFLOW® P-67 acrylic resin by Estron Chemical, Inc., which is a 2-propenoic acid, ethyl ester polymer. Another preferred flow control agent is sold under the tradename Benzoin by DSM, Inc., which is a 2-hydroxy-1,2-diphenylethanone crystalline solid that is believed to keep the molten coating open for a suitable time to allow outgassing to occur prior to the formation of the hard set film. Other examples of the flow control agents include the MODAFLOW® poly(alkyl acrylate) products available from Monsanto and the SURFYNOL® acetylenic diols (e.g., P200), available from Air Products, which contain hydroxyl, carboxyl or other functional groups. The functionalized flow additives also aid intercoat adhesion in the event that touch-up or repair of the powder coating is necessary. The flow control agents may be used singly or in combination. When present, the flow control agent may be used at an amount of 1 part by weight to 5 parts by weight, per 100 parts by weight of epoxy resin.

Suitable dry flow agents include fumed silica (for example that sold under the tradename CAB-O-SIL® by Cabot Corporation) and fumed alumina, for example that sold under the tradename Aluminum Oxide C by Degussa Corporation). When present, the dry flow agent may be used in an amount of 0.05 weight percent to 0.5 weight percent, based on the total weight of the composition.

Pigments may be used to adjust color and opacity. Suitable pigments include, for example, titanium dioxide, carbon black, phthalocyanine blue, phthalocyanine green, quinacridone red, perylene red, isoindolone yellow, dioxazine violet, scarlet 3B lake, red 188 azo red, azo pigment yellow 83, iron oxide pigments, and the like. When present, the pigment may be used in an amount of up to 100 parts by weight per 100 parts by weight resin.

Suitable extenders/fillers include calcium carbonate, barium sulfate, dolomite, wollastonite, talc, mica, and the like. When present, the extender may be used in an amount up to 120 parts by weight per 100 parts by weight resin. Within this range, an extender amount of at least 10 parts by weight is preferred. Also within this range, an extender amount of up to 80 parts by weight is preferred.

Suitable antioxidants, which prevent discoloration of the powder coating, include, for example, sodium hypophosphite, tris-(2,4-di-t-butyl phenyl) phosphite (available as IRGAFOS® 168 from Ciba-Geigy), calcium bis([monoethyl (3,5-di-t-butyl-4-hydroxybenzyl)phosphonate] (available as IRGANOX® 1425 from Ciba-Geigy), and the like. Mixtures of antioxidants may be used. When present, antioxidants may be used in an amount of 0.5 to 2.0 parts by weight per 100 parts by weight of resin.

Suitable optical brighteners include, for example, 2,2'-(2, 5-thiophenediyl)bis(5-t-butylbenzoxazole), available as UVITEX® OB from Ciba-Geigy. When present, optical brighteners may be present at 0.1 to 0.5 parts by weight per 100 parts by weight of the resin.

UV light stabilizers include, but are not limited to, di[4 (2,2,6,6-tetramethyl piperidinyl)]sebacate, benzotriazoles, such as, 2(2'hydroxy-5'-methylphenyl)benzotriazole, 3-(2'-hydroxy-3',5-di-t-butylphenyl)benzotriazole, 2-(3',5'-ditert-butyl-2'-hydroxyphenyl)5 chlorobenzotriazole, nickel bis [O-ethyl(3,5-ditert-butyl-4-hydroxy benzyl)]phosphonate and the like. The UV light stabilizers may be contained in an amount of from 0.1 to 5 weight percent (wt %), and preferably from 0.1 to 3 wt %, of the powder coating.

The first and second film-forming systems as disclosed above are separately prepared. There is no particular limitation on the method used for forming the separate systems. Preferred methods include melt mixing, in which the dry ingredients are weighed into a batch mixer and are mixed with a medium intensity horizontal plowmixer or a lesser intensity tumble mixer. Mixing times may be from 1 to 3 minutes for the high intensity mixers to 30–60 minutes for the tumble mixers. The premix may then be further mixed and compounded as the resin is melted in either a single screw or a twin screw extruder for 0.5 to 1 minute, generally at 140° F. to 180° F., with control of the extruder temperature to minimize any curing and gelation from taking place in the extruder. The aforesaid extruder temperatures are lower than the typical cure temperatures of the film-forming systems that can begin initial curing at temperatures starting at 200° F.

After extrusion, the separate film-forming systems are usually in chip form. After cooling, the two film-forming systems are ground together in a mill, such as a Brinkman mill or a Bantam hammer mill, to achieve the desired particle size. Particle size determines the coarseness or fineness of the texture of the powder coating set on the substrate. Generally, the particle size is from 60 mesh (for coarse) to 200 mesh (for fine), depending upon the desired texture. Average particle size is typically 20 to 80 micrometers. Scalping at 100 mesh is typical to remove coarse particles. There is typically about 10–15 wt % of particles below 11 micrometers and 0–4 wt % of particles above 88 micrometers.

The coating powder may be applied to substrates by conventional means, including electrostatic fluidized beds, electrostatic spray guns, triboelectric guns, and the like, in which the powder coating particles are electrostatically charged and the substrate is grounded or oppositely charged. The substrate is heated (and may optionally be pre-heated prior to application), to aid the melt, flow, and coalescence of the particles to form a smooth, continuous film. Coating powders are generally applied to achieve a coating thickness of 1.0 mil (0.0245 millimeters, "mm") to 25 mils (0.102 mm), preferably least 1.5 to 4 mils (0.038 to 0.1 mm). For decorative finishes, film thicknesses as low as 20 micrometers should be mentioned, but it is more usual for the film thickness to fall within the range of 25 to 120 micrometers, with common ranges being 30 to 80 micrometers for some applications, and 60 to 120 micrometers or, more preferably, 60 to 100 micrometers for other applications, while film thicknesses of 80 to 150 micrometers are less common, but not rare.

The coating film is then cured to a thermoset state without degrading the substrate. Heating may be performed in infrared, convection ovens, or a combination of both, although infrared ovens are preferred. Time and temperature of the final cure will vary somewhat depending on the film-forming systems employed and on the conditions of use. Typical time and temperatures are from 1 minute at 325° F. to 20 minutes at 225° F. Cure times anywhere from a few seconds to 30 minutes are typically considered normal or acceptable oven dwell times for electrostatic spray lines. Regardless of cure time and temperatures employed, provided that the film-forming system ingredients have been sufficiently melted before curing, the powder coatings generated on the substrates will have a visually consistent appearance.

The composition is particularly useful in the coating of heat-sensitive substrates such as plastics, paper, cardboard and woods. Wood is herein defined as any lignocellulosic material, whether it comes from trees or other plants, and whether it be in its natural forms, shaped in a saw mill, separated into sheets and made into plywood, or chipped and made into particleboard, or whether its fibers have been separated, felted, or compressed. It is exemplified by lumber, panels, molding, siding, oriented strand board, hardboard, medium density fiberboard (MDF), and the like. Fiberboard having a pattern such as a simulated wood grain printed on its surface, rather than on a paper laminated to that surface, and a coating powder of this invention over said pattern has the appearance of natural wood. MDF is a particularly valuable coating substrate. Substrates may preferably have a moisture content of 3 to 10% by weight. The substrate may be treated to enhance its electrical conductivity. Thus, a porous substrate such as particleboard, pre-coated with a conductive liquid coating composition and cured, may also serve as a substrate for the coating powder. The curable coating powder is also useful for coating plastic parts for the interior and exterior of automobiles.

Furthermore, at these cure conditions, no significant outgassing is noticed, for example, from the wood substrate that could degrade the substrate integrity as well as form large noticeable craters and popping defects in the continuous hard cured textured finish. This film continuity is especially surprising as pinholes are much larger than the variations in the surface profile of the textured coating. It is also surprising that a smooth fine texture can be formed on unprimed surfaces, such as wooden particle board, without any evidence of outgassing. In addition, the high viscosity and low melt flow of these compositions that are provided for texturing allows the cured powder coating to uniformly cover and hide not only the face of the wood substrate, but also unexpectedly the edges of wood substrates, which are highly porous and, thus, most difficult to uniformly coat in an electrostatic spray coating process.

The coating powder compositions are surprisingly shelf stable, and do not separate into individual components during typical powder coating application. They also cure well at low temperatures, and provide UV light resistant coatings.

EXAMPLE

A first film-forming system comprising 84 phr GMA acrylic resin (Almatex PD 7690 from Anderson Developments of Michigan), 16 phr sebacic acid, 1 phr acrylate flow controller (RESIFLOW P67 or MODAFLOW 2000), 0.5 phr 2-phenol-imidazole and 20 phr titanium oxide was mixed at high speed, melt mixed in an extruder and chipped. A second film forming system comprising 70 phr carboxyl terminated polyester resin (Rucote 911 from Vantico of Hicksville, N.Y.), 30 phr acrylic resin (EP 550 from Estron of Tennessee), 0.5 phr 2-phenol imidazole, 1 phr acrylate flow controller (RESIFLOW P67 or MODAFLOW 2000) and 20 phr titanium oxide was also mixed at high speed, melt mixed in an extruder and chipped. The first film-forming mixture (52.5% by weight) and the second film forming mixture (47.5% by weight) were then combined with 0.2% fumed aluminum oxide, tumbled and ground together to result in a powder coating with an average particle size of 30–45 micrometers. An MDF medium density fiberboard was heated for 10 to 15 minutes at 375° F. to achieve a surface temperature of 140–225° F. The powder coating was applied to the hot fiberboard substrate and cured at 300° F. for 4 to 5 minutes. The resulting coating had a thickness of 4 to 10 mils, a fine textured appearance, and a gloss of 10–20% at 60° as measured by ASTM D523.

As can be seen from the preceding example, a powder coating composition described above is suitable for use with heat sensitive materials and results in a low gloss finish with a fine textured appearance. The above-described composition will not deteriorate upon exposure to UV radiation.

The invention claimed is:

1. A coating powder composition comprising a mixture of
   a first film-forming system comprising a glycidyl methacrylate (GMA) resin, a curing agent, and a catalyst; and
   a second film-forming system comprising a carboxyl terminated polyester, an acrylic resin, and a catalyst,
   wherein the said film-forming system forms a coating having a gloss greater than 80% measured at 60° and the said second film-forming system forms a coating having a gloss less than 50% measured at 60°.

2. A coating powder composition comprising a mixture of
   a first film-forming system comprising a glycidyl methacrylate (GMA) resin; and
   a separately prepared second film-forming system comprising a carboxyl terminated polyester, an acrylic resin, and a catalyst chosen from imidazoles, organoborate salts, polyamines and phenolics.

3. The coating powder composition of claim 1, wherein each of the said catalysts is chosen from imidazoles, organoborate salts, polyamines and phenolics.

4. A coating powder composition as claimed in claim 1, wherein the said carboxyl terminated polyester comprises the reaction product obtained by capping a hydroxyl functional polyester with a polyfunctional carboxylic acid.

5. A coating powder composition as claimed in claim 2, wherein the said acrylic resin comprises a carboxyl-functional acrylic polymer having an acid number of from 15 to 200.

6. A coating powder composition as claimed in claim 1, wherein the said curing agent comprises a difunctional carboxylic acid.

* * * * *